(12) United States Patent
Chockalingam et al.

(10) Patent No.: US 10,719,407 B1
(45) Date of Patent: Jul. 21, 2020

(54) BACKING UP AVAILABILITY GROUP DATABASES CONFIGURED ON MULTI-NODE VIRTUAL SERVERS

(71) Applicant: EMC IP Holding Company LLC, Hopkinton, MA (US)

(72) Inventors: Elango Chockalingam, Bangalore (IN); Gajendran Raghunathan, Bangalore (IN); Yashomathi Krishnamurthy, Bangalore (IN); Arathi Bhandari, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 282 days.

(21) Appl. No.: 15/613,950

(22) Filed: Jun. 5, 2017

(51) Int. Cl.
  *G06F 11/14* (2006.01)
  *G06F 11/07* (2006.01)
  *G06F 16/23* (2019.01)
(52) U.S. Cl.
  CPC ...... *G06F 11/1461* (2013.01); *G06F 11/0712* (2013.01); *G06F 16/23* (2019.01)
(58) Field of Classification Search
  CPC ... G06F 11/1461; G06F 16/23; G06F 11/0712
  See application file for complete search history.

(56) References Cited

U.S. PATENT DOCUMENTS

| 8,219,769 B1* | 7/2012 | Wilk | G06F 11/1464 |
| | | | 707/640 |
| 2007/0180314 A1* | 8/2007 | Kawashima | G06F 11/3433 |
| | | | 714/15 |
| 2018/0157710 A1* | 6/2018 | Guirguis | G06F 16/27 |

* cited by examiner

*Primary Examiner* — Loc Tran
(74) *Attorney, Agent, or Firm* — Dergosits & Noah LLP; Todd A. Noah

(57) ABSTRACT

Backing up availability group databases configured on multi-node virtual servers is described. A system identifies an availability group scheduled for backup. The system determines whether the availability group is configured on at least one virtual server in a cluster of nodes associated with the availability group. If the availability group is configured on at least one virtual server in the cluster of nodes, the system retrieves information from a server in the cluster of nodes. The system uses the retrieved information to identify a database replica that is preferred for backing up the availability group. The system identifies a virtual server, in the cluster of nodes, that is associated with the identified database replica. The system identifies a node for backing up the availability group by identifying an active node from the nodes in the identified virtual server. The system backs up the availability group via the identified node.

17 Claims, 3 Drawing Sheets

BACKING UP AVAILABILITY GROUP DATABASES CONFIGURED ON MULTI-NODE VIRTUAL SERVERS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

Some computer systems, such as Microsoft's SQL Server 2016, include an "Always On" availability group, which can be a high-availability and disaster-recovery solution that provides an enterprise-level alternative to database mirroring. An availability group can maximize the availability of a set of user databases for an enterprise, and support a failover environment for a discrete set of user databases, known as availability databases, that fail over together from one computer in a cluster of computers to another computer in the cluster of computers. Each computer in the cluster may be referred to as a node. A primary database replica in an availability group may be made available for read/write access, while each secondary database replica may be made available for read-only access and/or some backup operations. A secondary database replica becomes the new read/write database replica when the primary database replica is no longer sufficiently accessible. Backup performance can improve if a system administrator specifies availability group properties, such as backup preference of a secondary database replica over a primary database replica for creating backup files, thereby reducing the load on the production server that is using the primary database replica.

Some computer system may provide a virtual machine, which can be a software implementation of a computer that executes programs like a physical device. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, which is known as hardware virtualization, the key to a cloud computing environment. Such computer systems may provide a virtual server, which can be a software implementation of a host computer that runs computer programs which share their resources or services with client devices.

A multi-node virtual server, which can be referred to as a shared cluster of nodes or a failover cluster instance, can support an availability group by one of the nodes in the multi-node virtual server using a database replica until the node fails, at which time another node in the multi-node virtual server begins using the database replica. In addition to a multi-node virtual server offering internal failover protection for an availability group, a cluster of computers that includes many multi-node virtual servers can offer levels of failover protection for an availability group. For example, a first node in a first multi-node virtual server uses a primary database replica until the first node fails, at which time the second node in the first multi-node virtual server uses the primary database replica until the second node fails, at which time a node in a second multi-node virtual server uses a secondary database replica. Although this example describes a cluster of computers that includes only two multi-node virtual servers, with each multi-node virtual server including at most two nodes, a cluster of computers may include any number of multi-node virtual servers, with each multi-node virtual server including any number of nodes. Similar to other data objects, backup copies may be made of a multi-node virtual server's data objects to enable a restoration of the multi-node virtual server's data objects in the event of corruption or an erroneous update to the multi-node virtual server's data objects.

A data object may be stored on a storage array, which is a disk storage system that includes multiple disk drives. Unlike a disk enclosure, a storage array may have cache memory and advanced functionality, such as virtualization and Redundant Array of Independent Disks (RAID). A data protection administrator may manage a backup/restore application to create backups files of data objects, and store the backup files of data objects on multiple storage arrays.

DETAILED DESCRIPTION

Figure 1:
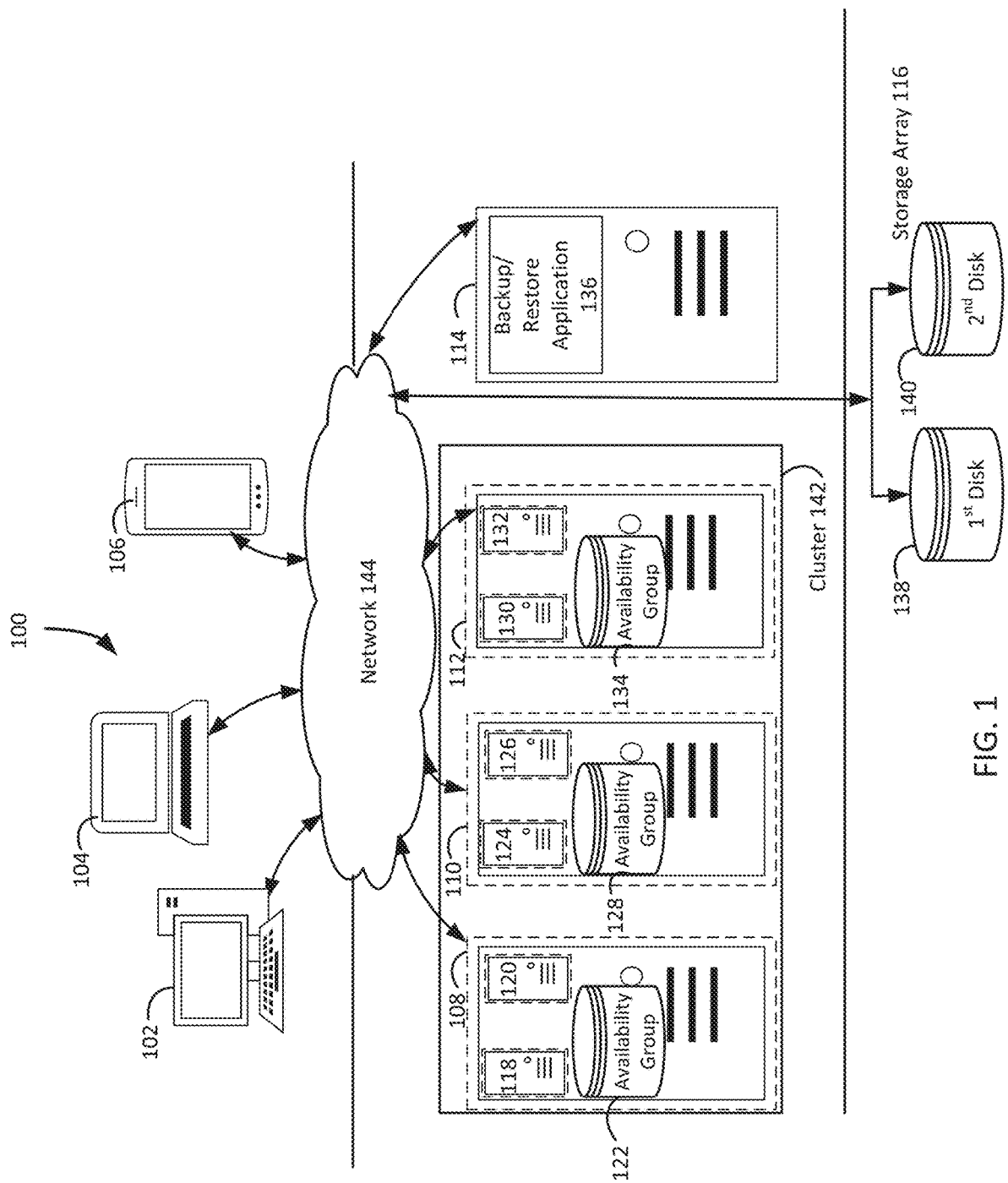
FIG. 1 illustrates a block diagram of an example system for backing up availability group databases configured on multi-node virtual servers, under an embodiment.

A backup/restore application can use availability group information and cluster configuration information to backup data objects. For example, a backup/restore application can use such information to identify that a database administrator specified a preference for creating a backup of a secondary database replica, to identify that the second node in an availability group's cluster of computers is configured to use the secondary database replica, and to send a backup job to the second node that instructs the second node to both create a backup file of the secondary database replica and to store the backup file to a storage array. However, a backup/restore application may fail when attempting to back up a multi-node virtual server's data objects. For example, when the backup/restore application attempts to send a backup job to a multi-node virtual server to instruct the multi-node virtual server to backup the multi-node virtual server's database replica, the backup/restore application needs to send the backup job to one node to result in correct execution, but the multi-node virtual server includes multiple nodes. Furthermore, only one of the nodes in the multi-tenant virtual server is an active node that can currently access the multi-node virtual server's database replica, such that if the backup/restore application sends the backup job to an inactive node that cannot currently access the multi-node virtual server's database replica, then a backup failure results.

Some database administrators have addressed this challenge by adding a standalone server to an availability group's cluster of computers that includes at least one multi-node virtual server, and configuring the standalone server to support a secondary database replica. The database administrator needs to set the backup priority for this standalone server to be the highest of all backup priorities, so that the backup/restore application will always select the standalone server for backing up the availability group. However, the standalone server's highest priority would prevent the backup/restore application from ever honoring the database administrator's previous selections to create backup files for multi-node virtual servers that are using the primary and secondary database replicas. The database administrator may have prioritized the creation of backup files from a local multi-node virtual server that uses the primary database replica over the creation of backup files from any remote server that uses the secondary database replica because of the long lag time in propagating changes from the primary database replica to the secondary database replica. The database administrator may have other reasons for prioritizing the creation of backup files from a multi-node virtual server that uses the secondary database replica over the creation of backup files from any standalone server that uses the secondary database replica. However, the addition of the standalone server with the highest priority to the availability group's cluster of computers may result in frustrating the database administrator's previous prioritizations. Furthermore, if the standalone server fails when attempting to back up the availability group, then the inability to create backup files from any of the multi-node virtual servers would result in the backup/restore application failing when attempting to back up the availability group.

Embodiments herein back up availability group databases configured on multi-node virtual servers. A system identifies an availability group scheduled for backup. The system determines whether the availability group is configured on at least one virtual server in a cluster of nodes associated with the availability group. If the availability group is configured on at least one virtual server in the cluster of nodes associated with the availability group, the system retrieves information from a server in the cluster of nodes. The system uses the retrieved information to identify a database replica that is preferred for backing up the availability group. The system identifies a virtual server, in the cluster of nodes, that is associated with the identified database replica. The system identifies a node for backing up the availability group by identifying an active node from nodes in the identified virtual server. The system backs up the availability group via the identified node.

For example, a backup/restore application determines that the SQL availability group AG1 is scheduled for backup at midnight. At midnight, the backup/restore application determines whether the SQL availability group AG1 is configured on any multi-node SQL virtual servers in the cluster of nodes that support the SQL availability group AG1. Since the SQL availability group AG1 is configured on 3 multi-node SQL virtual servers in this cluster of nodes, the backup/restore application retrieves availability group and cluster configuration information from the master server in this cluster of 3 multi-node SQL virtual servers.

The backup/restore application uses the retrieved availability group and cluster configuration information to identify that the database administrator set a preference for using a secondary database replica for backing up the SQL availability group AG1. The backup/restore application identifies the $2^{nd}$ and $3^{rd}$ multi-node SQL virtual servers, in the cluster of 3 multi-node virtual servers, as supporting the identified secondary database replica. Then the backup/restore application identifies that the $2^{nd}$ multi-node SQL virtual server has a higher priority than the $3^{rd}$ multi-node SQL virtual server for creating backup files. Since the backup/restore application identifies that the $3^{rd}$ node in the $2^{nd}$ multi-node SQL virtual server is currently functioning as the active node for the nodes in the $2^{nd}$ multi-node SQL virtual server, the backup/restore application identifies the $3^{rd}$ node in the $2^{nd}$ multi-node SQL virtual server for backing up the SQL availability group AG1. The backup/restore application spawns a backup job for the SQL availability group AG1, and sends the backup job to the $3^{rd}$ node in the $2^{nd}$ multi-node SQL virtual server. After receiving the backup job, the $3^{rd}$ node in the $2^{nd}$ multi-node SQL virtual server backs up the SQL availability group AG1 to a storage array, and reports the successful creation of the backup file for the SQL availability group AG1 to the backup/restore application.

FIG. 1 illustrates a block diagram of a system that back up availability group databases configured on multi-node virtual servers, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a third server 112, and a fourth server 114 and a storage array 116 that may be provided by a hosting company. The first server 108 is a first virtual server 108 that includes a first node 118, a second node 120, and a primary availability group 122. The second server 110 is a second virtual server 110 that includes a third node 124, a fourth node 126, and a secondary availability group 128. The third server 112 is a third virtual server 112 that includes a fifth node 130, a sixth node 132, and a secondary availability group 134. The fourth server 114 includes a backup/restore application 136. The storage array 112 includes a first disk 138 and a second disk 140. The servers 108-112 comprise a cluster 142, which does not include the fourth server 114. The servers 108-112 may be referred to as nodes 108-112 in the cluster 138. The clients 102-106 and the servers 108-114 communicate via a network 144.

FIG. 1 depicts the system 100 with three clients 102-106, four servers 108-114, one storage array 116, six nodes 118, 120, 124, 126, 130, and 132, three availability group instances 122, 128, and 134, one backup/restore application 136, two disks 138-140, one cluster 142, and one network 144. However, the system 100 may include any number of clients 102-106, any number of servers 108-114, any number of nodes 118, 120, 124, 126, 130, and 132, any number of availability group instances 122, 128, and 134, any number of backup/restore application 136, any number of disks 138-140, any number of cluster 142, and any number of network 144. The clients 102-106 and the servers 108-114 may each be substantially similar to the system 300 depicted in FIG. 3 and described below in reference to FIG. 3. FIG. 1 depicts the backup/restore application 136 residing completely on the fourth server 114, but the backup/application 136 may reside completely on any of the servers 108-112, completely on any of the clients 102-106, completely on another server that is not depicted in FIG. 1, or in any combination of partially on the servers 108-114, partially on the clients 102-106, and partially on the other server. The backup/restore application 136 may provide a plug-in to any of the clients 102-106 and/or any of the servers 108-114 that enables any of the clients 102-106 and/or any of the servers 108-114 to execute the commands to back up and restore a database replica. Even though the following paragraphs describe EMC Corporation's Avamar® backup/restore application and EMC Corporation's NetWorker® backup/restore application as examples of the backup/restore application 136, the backup/restore application 136 may be any other backup/restore application which provides the backup/restore functionalities described in the Background section.

The backup/restore application 136 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 136 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments.

Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. NetWorker® modules for Microsoft® applications leverage volume snapshot service and virtual device interface technology to protect Microsoft® Applications data. NetWorker® modules for Microsoft® applications support Microsoft application such as Microsoft® Exchange, Microsoft® Sharepoint and Microsoft® Hyper-V via volume snapshot service and virtual device interface technology. NetWorker® modules for Microsoft® applications support Microsoft® SQL Server versions and their features from Microsoft® SQL Server 2005 through the latest version of Microsoft® SQL Server 2016. Although the functionality examples described in this paragraph apply to EMC Corporation's NetWorker® backup/restore application, one of skill in the art would recognize that other backup/restore applications and their corresponding functionalities may be used. The backup/restore application 136 may also be implemented as a NetWorker® Module For Microsoft Applications, which, as stated above, may reside completely on any of the servers 108-114, completely on any of the clients 102-106, completely on another server that is not depicted in FIG. 1, or in any combination of partially on the servers 108-114, partially on the clients 102-106, and partially on the other server.

References in this disclosure to a primary database replica may refer to multiple primary database replicas that correspond to multiple secondary database replicas stored by the secondary nodes. For an example of one primary database replica in an availability group, the primary database replica X is in the primary availability group 122, and the secondary database replicas X are in each of the secondary availability groups 128 and 134. For an example of multiple primary database replicas in an availability group, the primary database replicas X and Y are in the primary availability group 122, and the secondary database replicas X and Y are in each of the secondary availability groups 128 and 134.

The system 100 identifies an availability group that is scheduled for backup. For example, the backup/restore application 136 determines that the SQL availability group AG1 is scheduled for backup at midnight. An availability group can be a combination of at least one read/write primary database replica, which includes a set of at least one database, and at least one read-only secondary database replica, which includes the corresponding set of database(s). A backup file, or a backup database replica, can be an extra copy of a structured set of information in case the original is lost or damaged.

Having identified an availability group that is scheduled for backup, the system 100 determines whether the availability group is configured on at least one virtual server in a cluster of nodes associated with the availability group. For example, at midnight the backup/restore application 136 determines whether the SQL availability group AG1 is configured on any multi-node SQL virtual servers in the cluster of nodes 142 that support the SQL availability group AG1 in the availability group 122, 128, and 134. A cluster of nodes can be a group of computers that manage access to a centralized resource in a network. If the availability group that is scheduled for backup is not configured on at least one virtual server in a cluster of nodes associated with the availability group, the backup/restore application 136 backs up the availability group via the standard process used by typical backup/restore applications to backup up availability groups.

If an availability group that is scheduled for backup is also configured on at least one virtual server in a cluster of nodes associated with the availability group, the system 100 retrieves information from a server in the cluster of nodes. For example, the backup/restore application 136 retrieves availability group and cluster configuration information from the master server 108 in the cluster 142 of 3 multi-node SQL virtual servers 108-112 because the SQL availability group AG1 is configured on 3 multi-node SQL virtual servers 108-112 in the cluster 142. Although this example describes the backup/restore application 136 retrieving availability group and cluster configuration information from the master server 108 in this cluster 142 of 3 multi-node SQL virtual servers 108-112, the backup/restore application 136 can retrieve availability group and cluster configuration information from any server in the cluster 142. Information can be facts provided about something, such as data about an availability group or data about cluster configuration. A server can be a host computer that runs computer programs which share their resources or services with client devices.

After retrieving information from a server in a cluster of nodes associated with an availability group that is scheduled for backup, the system 100 uses the retrieved information to identify a database replica that is preferred for backing up the availability group. For example, the backup/restore application 136 uses the retrieved availability group and cluster configuration information to identify that the database administrator set a preference for using a secondary database replica for backing up the SQL availability group AG1 in the availability group 122, 128, and 134. Table 1 below depicts an example of availability group and cluster configuration information.

TABLE 1

| Name | Database | Replica Holder | Replica Type | Backup Preference | Backup Priority |
| --- | --- | --- | --- | --- | --- |
| AG1 | DB1 ... DB50 | Virtual Server 1 | Primary | | 50 |
| AG1 | DB1 ... DB50 | Virtual Server 2 | Secondary 1 | Secondary | 70 |
| AG1 | DB1 ... DB50 | Virtual Server 3 | Secondary 2 | | 60 |

A database replica can be a copy of a structured set of information held in a computer, especially one that is accessible in various ways. A primary database replica can be a read/write accessible copy of a structured set of information for an availability group. A secondary database replica can be a read-only accessible copy of a structured set of information for an availability group.

Following identification of a database replica that is preferred for backing up an availability group that is scheduled for backup, the system 100 identifies a virtual server, in a cluster of nodes associated with the availability group, that is associated with the database replica. For example, the backup/restore application 136 identifies the $2^{nd}$ and $3^{rd}$ multi-node SQL virtual servers 110 and 112, in the cluster 142 of 3 multi-node virtual servers 108-112, as supporting the identified secondary database replica. Continuing this example, the backup/restore application 136 identifies that the $2^{nd}$ multi-node SQL virtual server 110 has a higher priority than the $3^{rd}$ multi-node SQL virtual server 112 for creating backup files.

The backup preference for an availability group may identify the primary replica only, identify secondary replicas only, identify a secondary replicas preference, or identify an any replicas preference. If the backup preference identifies the primary replica only, the backup/restore application 136 identifies the virtual server which includes the primary availability group as the preferred virtual server for backing up the availability group, as the primary replica is always on-line, processing the most current data for its databases. If the backup preference identifies the secondary replica only, the backup/restore application 136 ignores the primary replica and identifies all of the secondary replicas in their order of priority by using table 1 above, and the backup/restore application 136 identifies the virtual server which includes the on-line replica with the highest priority as the preferred virtual server for backing up the availability group. If the backup preference identifies a secondary replica preference, the backup/restore application 136 ignores the primary replica and identifies all of the secondary replicas in their order of priority by using table 1 above, and the backup/restore application 136 identifies the virtual server which includes the on-line secondary replica with the highest priority as the preferred virtual server for backing up the availability group. If none of the secondary replicas is on-line, the backup/restore application 136 identifies the virtual server which includes the primary availability group as the preferred virtual server for backing up the availability group. If the backup preference identifies an any replicas preference, the backup/restore application 136 identifies all of the replicas in their order of priority by using table 1 above, and the backup/restore application 136 identifies the server which includes the on-line replica with the highest priority as the preferred virtual server for backing up the availability group.

Having identified a backup preference, the backup/restore application 136 determines whether the backup preference is on-line, and is therefore processing the most recent data for any database replicas that are part of its availability group for the backup preference server. For example, the backup/restore application 136 attempts to log in to the second virtual server 110, which includes the secondary availability group 128. If the server identified as the backup preference is on-line, the backup/restore application 136 identifies the backup preference as the preferred virtual server for backing up the availability group. For example, the backup/restore application 136 identifies the second virtual server 110, which includes the secondary availability group 128, as the preferred virtual server for backing up the SQL availability group AG1 based on the secondary availability group 128 on the second virtual server 110 being on-line. If the virtual server associated with the preferred database replica is not on-line, the backup/restore application 136 accesses information in table 1 above, and identifies the next preference for a virtual server.

Subsequent to identifying a virtual server that is associated with a database replica that is preferred for backing up an availability group that is scheduled for backup, the system 100 identifies a node for backing up the availability group by identifying an active node from nodes in the virtual server. For example, the backup/restore application 136 uses "-z Federated slave =true" to identify that the $3^{rd}$ node 124 in the $2^{nd}$ multi-node SQL virtual server 110 is currently functioning as the active node for the nodes in the $2^{nd}$ multi-node SQL virtual server 110, thereby identifying the $3^{rd}$ node 124 in the $2^{nd}$ multi-node SQL virtual server 110 for backing up the SQL availability group AG1. A node can be a computer, such as a server. that manages access to a centralized resource in a network. An active node can be a computer, such as a server, that is currently engaging or currently ready to engage in managing access to a centralized resource in a network.

By identifying an active node from nodes in a virtual server that is associated with a database replica that is preferred for backing up an availability group that is scheduled for backup, the system 100 backs up the availability group via this active node. For example, the backup/restore application 136 spawns a backup job for the SQL availability group AG1, and sends the backup job to the $3^{rd}$ node 124 in the $2^{nd}$ multi-node SQL virtual server 110. Continuing this example, the $3^{rd}$ node 124 in the $2^{nd}$ multi-node SQL virtual server 110 backs up the SQL availability group AG1 to the storage array 116, the storage array 116 sends the control data (or metadata) to the backup server 114, and the $3^{rd}$ node 124 reports the successful creation of the backup file for the SQL availability group AG1 to the backup/restore application 136 executing on the backup server 114.

The backup/restore application 136 creates backup files in a more transparent and expected way from the user's perspective, without any concern about whether the preferred backup replica is configured on a multi-node virtual server. The backup process functions seamlessly in the user's environment, even with manual and automatic failover scenarios of availability groups. Since the backup/restore application 136 performs backups on the preferred replica, backup performance improves when the production server is not loaded while backup files are created. The backup/restore application 136 executes a restore operation to restore a copy of the corresponding backup files for availability group databases configured on multi-node virtual servers similar to the restoration of any other data object.

Figure 2:
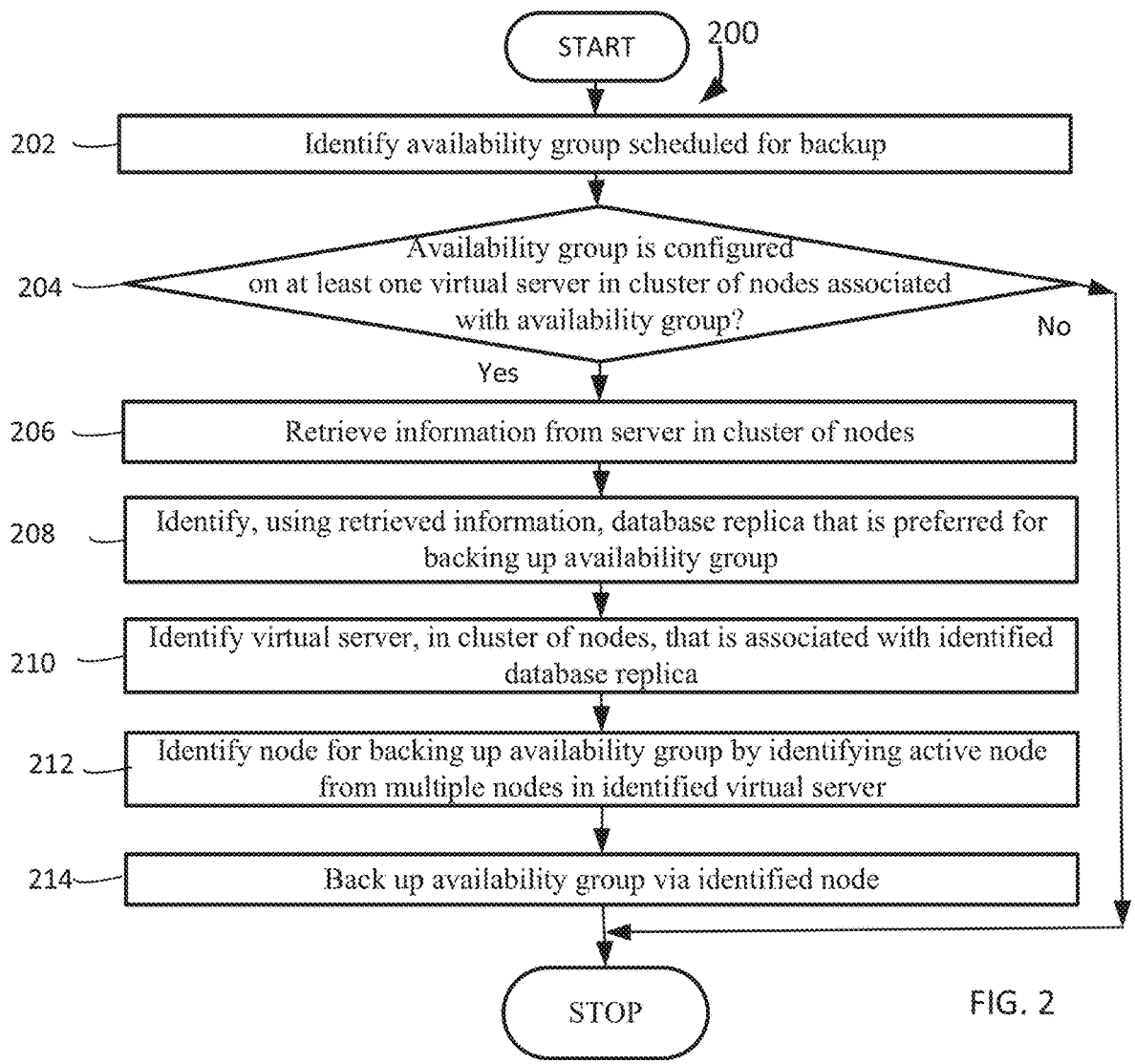
FIG. 2 is a flowchart that illustrates a method for backing up availability group databases configured on multi-node virtual servers, under an embodiment.

FIG. 2 is a flowchart that illustrates a method for backing up availability group databases configured on multi-node virtual servers, under an embodiment. Flowchart 200 illustrates method acts illustrated as flowchart blocks for certain steps involved in and/or between the clients 102-106 and/or the servers 108-114 of FIG. 1.

An availability group that is scheduled for backup is identified, block 202. The system 100 identifies backups that may be scheduled for availability databases configured on multi-node virtual servers. For example and without limitation, this can include the backup/restore application 136 determining that the SQL availability group AG1 is scheduled for backup at midnight.

Having identified an availability group, a determination is made whether the availability group is configured on at least one virtual server in a cluster of nodes associated with the availability group, block 204. The system 100 determines whether backups scheduled for availability databases are configured on multi-node virtual servers. By way of example and without limitation, this can include the backup/restore application 136 determining whether the SQL availability group AG1 is configured on any multi-node SQL virtual servers in the cluster of nodes 142 that support the SQL availability group AG1 in the availability group 122, 128, and 134.

If the availability group is configured on at least one virtual server in the cluster of nodes, information is retrieved from a server in the cluster of nodes, block 206. The system 100 retrieves information to backup availability databases configured on multi-node virtual servers. In embodiments, this can include the backup/restore application 136 retrieving availability group and cluster configuration information from the master server 108 in this cluster 142 of 3 multi-node SQL virtual servers 108-112 because the SQL availability group AG1 is configured on 3 multi-node SQL virtual servers 108-112 in the cluster 142.

Following the retrieval of information, the retrieved information is used to identify a database replica that is preferred for backing up the availability group, block 208. The system 100 identifies a database replica to backup availability databases configured on multi-node virtual servers. For example and without limitation, this can include the backup/restore application 136 using the retrieved availability group and cluster configuration information to identify that the database administrator set a preference for using a secondary database replica for backing up the SQL availability group AG1 in the availability group 122, 128, and 134.

After a database replica is identified, a virtual server is identified, in the cluster of nodes, that is associated with the identified database replica, block 210. The system 100 identifies a virtual server to backup availability databases configured on multi-node virtual servers. By way of example and without limitation, this can include the backup/restore application 136 identifying the $2^{nd}$ and $3^{rd}$ multi-node SQL virtual servers 110 and 112, in the cluster 142 of 3 multi-node virtual servers 108-112, as supporting the identified secondary database replica. Continuing this example, the backup/restore application 136 identifies that the $2^{nd}$ multi-node SQL virtual server 110 has a higher priority than the $3^{rd}$ multi-node SQL virtual server 112 for creating backup files.

Following the identification of a virtual server, a node is identified for backing up the availability group by identifying an active node from the nodes in the identified virtual server, block 212. The system 100 identifies an active node in a virtual server to backup availability databases configured on multi-node virtual servers. In embodiments, this can include the backup/restore application 136 identifying that the $3^{rd}$ node 124 in the $2^{nd}$ multi-node SQL virtual server 110 is currently functioning as the active node for the nodes in the $2^{nd}$ multi-node SQL virtual server 110, thereby identifying the $3^{rd}$ node 124 in the $2^{nd}$ multi-node SQL virtual server 110 for backing up the SQL availability group AG1.

Subsequent to identifying the active node in a virtual server, an availability group is backed up via the identified node, block 214. The system 100 backs up availability databases configured on multi-node virtual servers. For example and without limitation, this can include the backup/restore application 136 spawning a backup job for the SQL availability group AG1, and sending the backup job to the $3^{rd}$ node 124 in the $2^{nd}$ multi-node SQL virtual server 110. Continuing this example, the $3^{rd}$ node 124 in the $2^{nd}$ multi-node SQL virtual server 110 backs up the SQL availability group AG1 to the storage array 116, and reports the successful creation of the backup file for the SQL availability group AG1 to the backup/restore application 136 executing on the backup server 114.

Although FIG. 2 depicts the blocks 202-214 occurring in a specific order, the blocks 202-214 may occur in another order. In other implementations, each of the blocks 202-214 may also be executed in combination with other blocks and/or some blocks may be divided into a different set of blocks.

Figure 3:
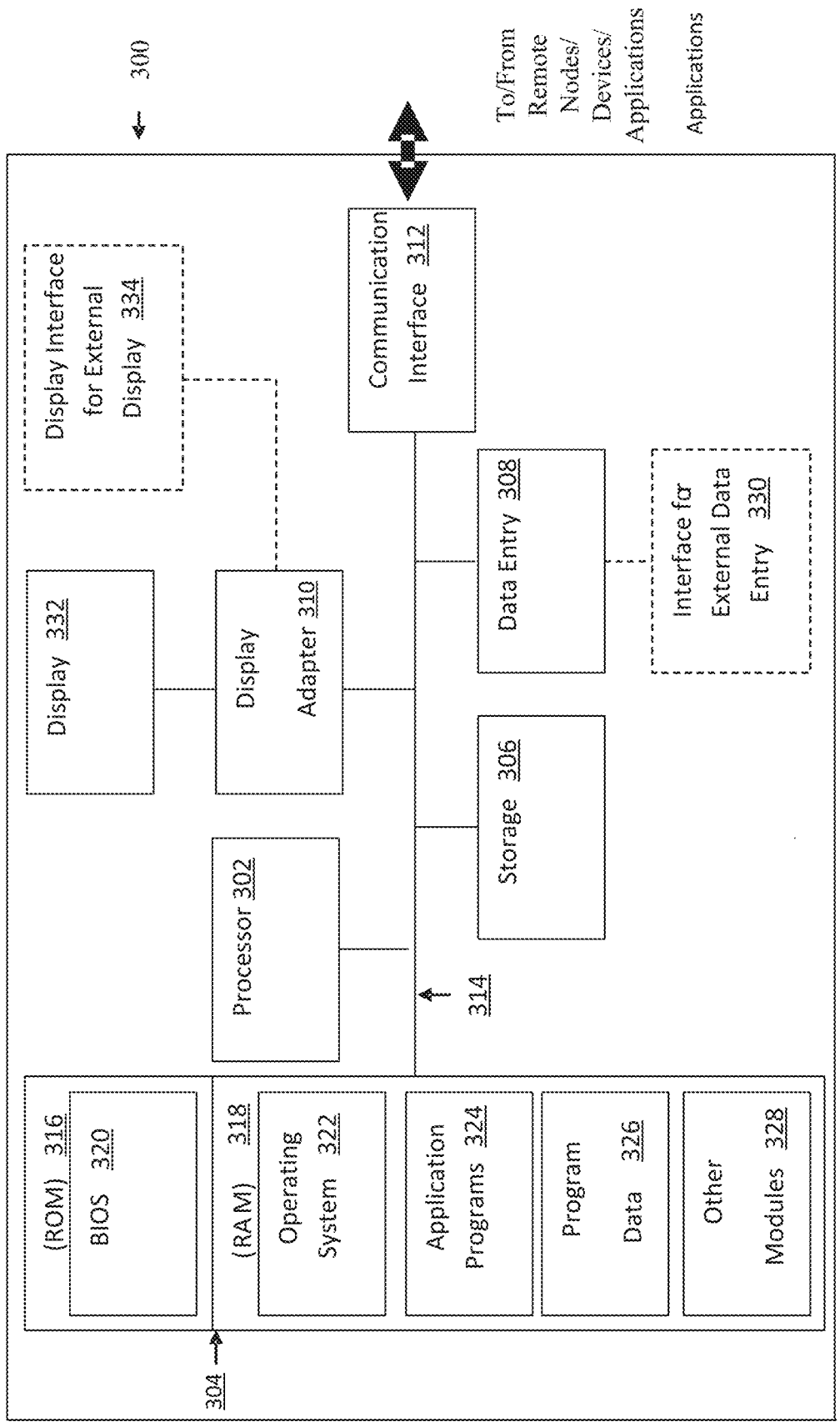
FIG. 3 is a block diagram illustrating an example hardware device in which the subject matter may be implemented.

Having describes the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, data entry module 308, display adapter 310, communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in memory 304 and/or storage 306 and/or received via data entry module 308.

The memory 304 may include read only memory (ROM) 316 and random access memory (RAM) 318. Memory 304 may be configured to store program instructions and data during operation of device 300. In various embodiments, memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 304 may also include nonvolatile memory technologies such as nonvolatile flash RAM (NVRAM) or ROM. In some embodiments, it is contemplated that memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, ROM 316 or RAM 318, including an operating system 322, one or more applications programs 324, program data 326, and other program modules 328. A user may enter commands and information into the hardware device 300 through data entry module 308. Data entry module 308 may include mechanisms such as a keyboard, a touch screen, a pointing device, etc. Other external input devices (not shown) are connected to the hardware device 300 via external data entry interface 330. By way of example and not limitation, external input devices may include a microphone, joystick, game pad, satellite dish, scanner, or the like. In some embodiments, external input devices may include video or audio input devices such as a video camera, a still camera, etc. Data entry module 308 may be configured to receive input from one or more users of device 300 and to deliver such input to processing unit 302 and/or memory 304 via bus 314.

A display 332 is also connected to the bus 314 via display adapter 310. Display 332 may be configured to display output of device 300 to one or more users. In some embodiments, a given device such as a touch screen, for example, may function as both data entry module 308 and display 332. External display devices may also be connected to the bus 314 via external display interface 334. Other peripheral output devices, not shown, such as speakers and printers, may be connected to the hardware device 300.

The hardware device 300 may operate in a networked environment using logical connections to one or more remote nodes (not shown) via communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 312 may include logic configured to support direct memory access (DMA) transfers between memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
    a processor-based application, which when executed on a computer having one or more processors, will cause one or more processors to:
        identify an availability group scheduled for backup;
        determine whether the availability group is operating on a plurality of multi-node virtual servers in a cluster of nodes associated with the availability group;
        retrieve information from a multi-node virtual server included in the plurality of multi-node virtual servers in the cluster of nodes in response to a determination that the availability group is operating on the plurality of multi-node virtual servers, the plurality of multi-node virtual servers including a plurality of database replicas of the availability group;
        identify, using the retrieved information, a database replica that is preferred for backing up the availability group;
        identify a multi-node virtual server in the cluster of nodes that stores the identified database replica;
        identify a back-up node, for backing up the availability group, as an active node from a plurality of virtual server nodes in the identified multi-node virtual server; and
        back up the availability group via the back-up node by spawning a backup job and sending the spawned backup job to the back-up node.

2. The system of claim 1, wherein the database replica that is preferred for backing up the availability group comprises one of a primary database replica and a secondary database replica.

3. The system of claim 2, wherein the primary database replica comprises a plurality of primary database replicas that correspond to a plurality of secondary database replicas comprising the secondary database replica.

4. The system of claim 1, wherein the retrieved information identifies respective plurality of nodes in at least one of the multi-node virtual servers in the cluster of nodes.

5. The system of claim 1, wherein the retrieved information comprises a backup preference and a plurality of backup priorities associated with a corresponding plurality of database replicas, wherein identifying the database replica that is preferred for backing up the availability group is based on the backup preference and the plurality of backup priorities.

6. The system of claim 1, wherein identifying the database replica that is preferred for backing up the availability group comprises one of identifying a primary database replica only, identifying secondary database replicas only, identifying a secondary database replicas preference, and identifying an any database replicas preference.

7. A method comprising:
    identifying an availability group scheduled for backup;
    determining whether the availability group is operating on a plurality of multi-node virtual servers in a cluster of nodes associated with the availability group;
    retrieving information from a multi-node virtual server included in the plurality of multi-node virtual servers in the cluster of nodes in response to a determination that the availability group is operating on the plurality of multi-node virtual servers, the plurality of multi-node virtual servers including a plurality of database replicas of the availability group;
    identifying, using the retrieved information, a database replica that is preferred for backing up the availability group;
    identifying a multi-node virtual server in the cluster of nodes that stores the identified database replica;
    identifying a back-up node, for backing up the availability group, as an active node from a plurality of virtual server nodes in the identified multi-node virtual server; and backing up the availability group via the back-up node by spawning a backup job and sending the spawned backup job to the back-up node.

8. The method of claim 7, wherein the database replica that is preferred for backing up the availability group comprises one of a primary database replica and a secondary database replica, the primary database replica comprising a plurality of primary database replicas that correspond to a plurality of secondary database replicas comprising the secondary database replica.

9. The method of claim 7, wherein the retrieved information identifies respective plurality of nodes in at least one of the multi-node virtual servers in the cluster of nodes.

10. The method of claim 7, wherein the retrieved information comprises a backup preference and a plurality of backup priorities associated with a corresponding plurality of database replicas, wherein identifying the database replica that is preferred for backing up the availability group is based on the backup preference and the plurality of backup priorities.

11. The method of claim 7, wherein identifying the database replica that is preferred for backing up the availability group comprises one of identifying a primary database replica only, identifying secondary database replicas only, identifying a secondary database replicas preference, and identifying an any database replicas preference.

12. A computer program product, comprising a non-transitory computer-readable medium having a computer-readable program code embodied therein to be executed by one or more processors, the program code including instructions to:
   identify an availability group scheduled for backup;
   determine whether the availability group operating on a plurality of multi-node virtual servers in a cluster of nodes associated with the availability group;
   retrieve information from a multi-node virtual server included in the plurality of multi-node virtual servers in the cluster of nodes in response to a determination that the availability group is operating on the plurality of multi-node virtual servers, the plurality of multi-node virtual servers including a plurality of database replicas of the availability group;
   identify, using the retrieved information, a database replica that is preferred for backing up the availability group;
   identify a multi-node virtual server in the cluster of nodes that stores the identified database replica;
   identify a back-up node, for backing up the availability group, as an active node from a plurality of virtual server nodes in the identified multi-node virtual server; and
   back up the availability group via the back-up node by spawning a backup job and sending the spawned backup job to the back-up node.

13. The computer program product of claim 12, wherein the database replica that is preferred for backing up the availability group comprises one of a primary database replica and a secondary database replica; and
   wherein the primary database replica comprises a plurality of primary database replicas that correspond to a plurality of secondary database replicas comprising the secondary database replica.

14. The computer program product of claim 12, wherein the retrieved information identifies respective plurality of nodes in at least one of the multi-node virtual servers in the cluster of nodes.

15. The computer program product of claim 12, wherein the retrieved information comprises a backup preference and a plurality of backup priorities associated with a corresponding plurality of database replicas, wherein identifying the database replica that is preferred for backing up the availability group is based on the backup preference and the plurality of backup priorities.

16. The computer program product of claim 12, wherein identifying the database replica that is preferred for backing up the availability group comprises one of identifying a primary database replica only, identifying secondary database replicas only, identifying a secondary database replicas preference, and identifying an any database replicas preference.

17. The system of claim 1, wherein determining whether the availability group is operating on a plurality of multi-node virtual servers in a cluster of nodes associated with the availability group comprises:
   determining whether the availability group is concurrently supported by at least a first multi-node virtual server and a second multi-node virtual server.

* * * * *